July 28, 1959  S. G. V. LARSSON  2,896,438
SCRAPING APPLIANCE, PARTICULARLY FOR MINK-SKINS
Filed Feb. 16, 1956  3 Sheets-Sheet 1

INVENTOR
SVEN GÖSTA VERNER LARSSON
By Albert R. Jacobs
Attorney

INVENTOR
SVEN GÖSTA VERNER LARSSON
By Albert H. Jacobs
Attorney

United States Patent Office 2,896,438
Patented July 28, 1959

2,896,438

SCRAPING APPLIANCE, PARTICULARLY FOR MINK-SKINS

Sven Gösta Verner Larsson, Nogersund, Hallevik, Sweden, assignor to Paul Autio, Astoria, Oreg.

Application February 16, 1956, Serial No. 566,006

Claims priority, application Sweden February 25, 1955

12 Claims. (Cl. 69—46)

The present invention generally relates to skin-scraping appliance for dressers of skins of furred animals and of a novel kind being particularly, although not exclusively, adapted for use in scraping mink-skins.

The principal object of the invention is to provide a mechanically operating appliance to replace or facilitate the elaborate manual work involved in cleaning the flesh-face of skins of furred animals, particularly mink-skins.

For the object stated, according to the present invention, a scraping appliance for skins of furred animals, particularly mink-skins, comprises a stationary frame, a scrape-stock journalled in said frame, said scrape-stock being of circular cross-section uniformly tapering towards one end of the stock, means for rotating said scrape-stock, means on said scrape-stock for stretching and fastening a skin spread-out in close engagement with the peripheral surface of said stock, said scrape-stock being rounded at its small end and being releasable from said frame at one end, at least, of the stock; and a scraping tool mounted on said frame so as to be displaceable along said scrape-stock as well as being swingable towards the stock in order to cause said scraping tool during the rotation of said stock to scrape said skin when fastened to the stock.

Further features and advantages of the present invention will appear from the more detailed description thereof hereinafter in conjunction with the accompanying drawings illustrating, by way of example only, a preferred embodiment of the invention in the form of a semi-automatic skin-scraping machine and in which.

Figure 1:
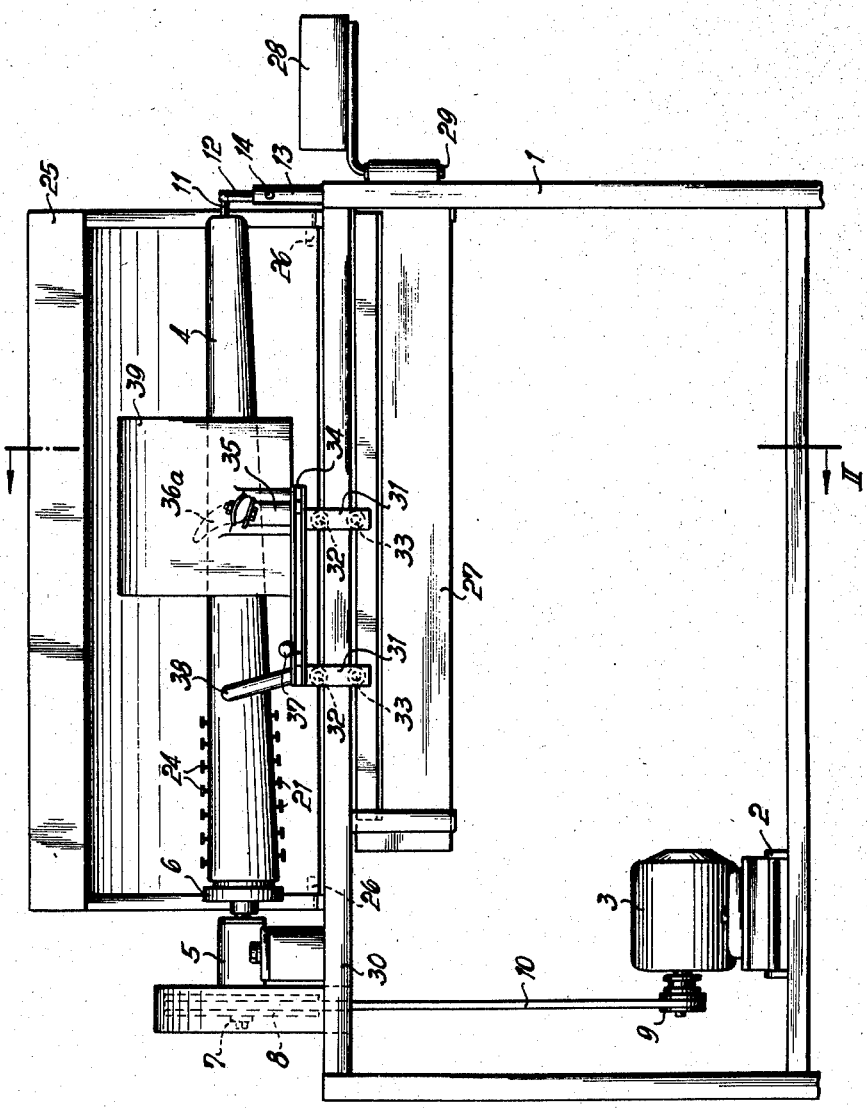
Fig. 1 is a side elevation of the machine.

Referring now to the drawings more specifically, the scraping machine comprises a stationary frame 1 made of angle irons and having at its bottom a pivotally mounted shelf 2 carrying an electric motor 3. Mounted on the frame 1 is a wooden spindle or stock 4 conically tapering towards one end and having its large end releasably secured in a chuck 6 which is journalled in a journal box 5 fixed to the frame 1 so as to cause the stock 4 to take part in the rotation of the chuck 6. Onto the peripheral surface of this stock 4 the skin or skins are intended to be stretched out and fastened in a manner to be described hereinafter. On the side of the journal box 5 remote from the stock 4, the journal or spindle 7 of the chuck 6 has secured thereto a pulley 8 arranged to be driven from a corresponding pulley of the motor 3 through a driving belt 10. The stock 4 is provided at its small end with a coaxially projecting metallic journal 11 by which this end of the stock is mounted in a vertically extending top-open slot made in a rod 12 which is vertically adjustable in a sleeve 13 upstanding from the frame 1 and is locatable by a locking screw 14 in a position such as to maintain the upper surface of the stock 4 in a correct position for performing the scraping operation.

Figure 3:
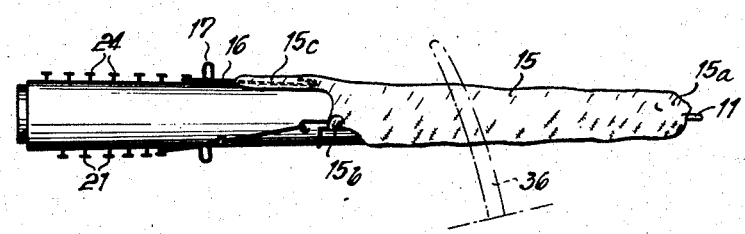
Fig. 3 is a scrap-view illustrating the operation of stretching and fastening a skin onto the scrape-stock, and Figs. 4 and 5, to a larger scale, illustrate suitable fasteners for stretching out the skin over the stock.

When a skin, such as a mink-skin 15 (see Fig. 3), is to be fastened to the scrape-stock 4 the stock 4 is first removed from the frame 1, after which the skin 15 is drawn, with its flesh-face exposed outwardly, over the stock from its rounded small end until the latter engages the head portion 15a of the skin, enabling the skin 15, with the journal pin 11 projecting through the mouth opening, to be smoothed out around the stock 4 so as to lie well stretched out and in close engagement uniformly over the peripheral surface of the stock, after which the skin is fastened to the stock 4.

Figure 4:
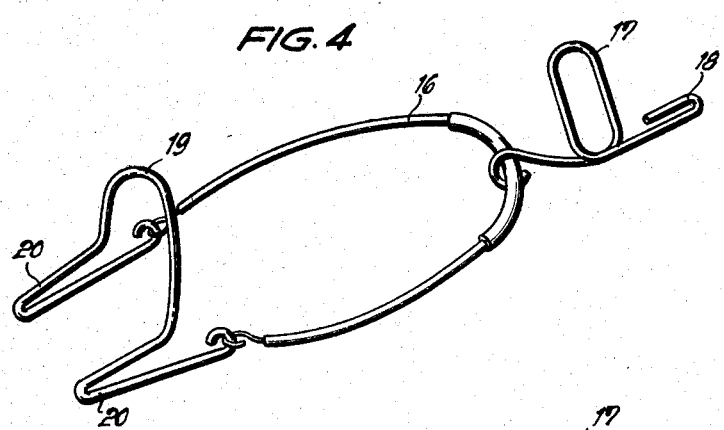
Figure 5:
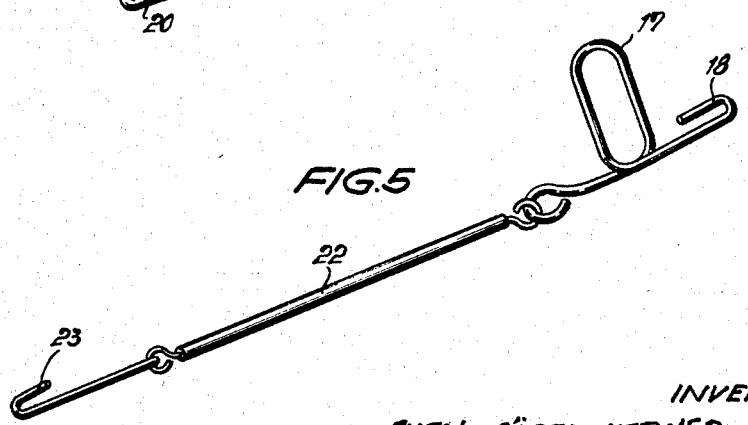

Suitable fasteners for fastening the skin 15 to the scrape-stock 4 are illustrated in Figs. 4 and 5. Fig. 4 illustrates a fastener which consists of a coil-spring strap 16 having attached to its central portion a hook 18 bent to form a grip 17. Secured to the extreme ends of the coil-spring strap 16 is a substantially U-shaped bracket which is adapted to clamp the stock 4 between the legs extending from its arcuated intervening portion 19. Said legs are bent into hooks 20 into which the two hind paws 15b of the skin 15 are inserted from inside and are clamped by tightening. After the fastener has been attached to the skin 15 in this way, the fastener is tensioned along the stock 4 towards the large end of the latter until, after a suitable amount of tension has been imparted to the skin 15, the hook 18 may be hooked onto a suitable one of a plurality of nails 21 partially driven into the stock at longitudinally spaced locations near the large end of the stock 4. Figure 5 illustrates a fastener which comprises a straight length of coil-spring strap 22 having attached to one of its ends a similar hook 18 formed with a grip 17. Attached to its opposite end is a hook 23 bent through 180°. The latter is adapted to be hooked into the tubular tail portion 15c of the skin 15 (see Fig. 3), after which the resilient fastener is tensioned along the stock 4 in a manner similar to that already described, and is hooked onto a suitable one of a second row of projecting nails 24 diametrically oppositely disposed relative to the nails 21.

Now the skin 15 is stretched and fastened to the scrape-stock 4 in a spread-out or expanded condition. The stock 4 is then inserted into the frame of the appliance, and upon starting the motor the stock carrying the skin will be rotated at a speed of approximately 300 revolutions per minute. The exposed flesh-face of the skin may then be scraped using a suitable hand tool of a kind known per se, but, in accordance with the present invention, the scraping is preferably carried out semi-automatically in a manner to be described hereinafter. The electric motor 3 could be provided with pulleys of different diameters enabling the speed of rotation of the stock 4 to be changed.

Figure 2:
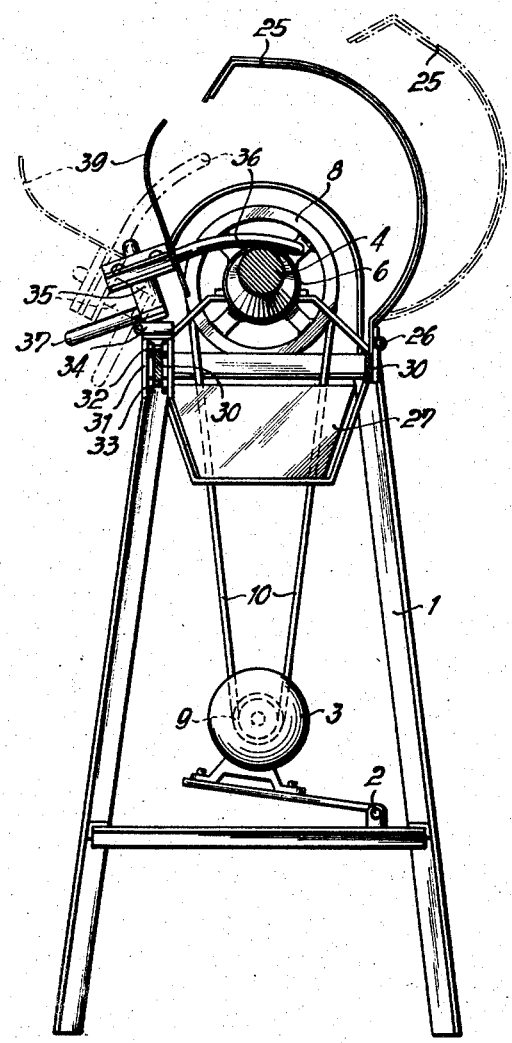
Fig. 2 is an end elevation of the same.

Referring again to Figs. 1 and 2 of the drawing, numeral 25 designates a splashboard vaulted arcuately over the stock 4 and hinged at 26 to be foldable into an operative position as indicated in broken lines in Fig. 2. Numeral 27 designates a trough removably received in the frame and serving to collect the matter scraped off from the skin 15, and numeral 28 designates a box mounted on the frame 1 and adjustable about a vertical pivot 29, this box serving as a receptacle for sawdust.

As will appear from the accompanying drawings, the preferred apparatus illustrated is combined with a scraping device of a special design. For this purpose, one longitudinally extending top-member 30 of the frame is formed as a guide rail or track for a carriage 31 having two pairs of rolls 32, 33 on which the carriage is adapted to run along the track. Hinged to the carriage 31 at 34 is a support 35 carrying a scraping tool consisting of an elongated blade 36 made of bone or the like, this tool being thus swingable towards and away from the scrape-stock 4. The scraping blade 36 is so adjusted as only with an edge 36a which is downwardly inclined to the vertical and is slightly arcuated longitudinally of the blade, to engage the stock 4, or the skin 15 fastened thereto, respectively. In addition, as will appear from Fig. 1, the scraping tool is set at an angle relative to the longitudinal axis of the stock 4, as well as being slightly arcuated laterally with its concave side facing the stock 4 (see also Fig. 2). Secured to the support 35 are two handles 37, 38, one for each hand and of which one, 37, is used in moving the carriage 31 along its track 30, and the other, 38, is used for swinging the support 35 and for pressing the scraping tool 36 against the stock and skin with a suitable force. Further attached to the support 35 is a guard plate 39.

The scraping tool 36, by moving the carriage 31 along the stock 4 during the rotation of the latter, can be displaced longitudinally of the stock 4 causing the downwardly directed edge 36a of the scraping tool to scrape the flesh-face of the skin 15.

What I claim is:

1. A scraping appliance for skins of furred animals, particularly mink-skins, and comprising in combination: a stationary frame, a scrape-stock journalled in said frame, said scrape-stock being of circular cross-section uniformly tapering towards one end of the stock, means for rotating said scrape-stock, means on said scrape-stock for stretching and fastening a skin spread-out in close engagement with the peripheral surface of said stock, said stock being rounded at its small end and being releasable from said frame at one end, at least, of the stock; and a scraping tool mounted on said frame so as to be displaceable along said scrape-stock as well as being swingable towards the stock in order to cause said scraping tool during the rotation of said stock to scrape said skin when fastened to the stock.

2. A scraping appliance according to claim 1 in which said scrape-stock is vertically adjustable at least at one end.

3. A scraping appliance according to claim 1 and further comprising a carriage movably mounted on said frame so as to be freely reciprocable along said scrape-stock, said scraping tool being mounted on said carriage so as to be swingable about an axis in spaced parallel relation to the axis of said stock, whereby said scraping tool is swingable towards and away from said stock and is engageable with the skin covering the stock at a desired pressure as the stock is being rotated, simultaneously displacing the scraping tool along said stock.

4. A scraping appliance according to claim 3 in which said scraping tool comprises an elongated blade which is engageable with a skin fastened to said scrape-stock with one, downwardly inclined edge only.

5. A scraping appliance according to claim 4 in which said blade is set at an oblique angle relative to the longitudinal axis of said scrape-stock.

6. A scraping appliance according to claim 5 in which said blade is laterally arcuated having its concave side facing said scrape-stock.

7. A scraping appliance according to claim 6 in which the edge of said scraping member to be engaged with a skin fastened to said scrape-stock is longitudinally arcuated.

8. A skin fastener to be used in a scraping appliance according to claim 1 for fastening a skin to the scrape-stock thereof, and comprising an elongated resilient member being provided at one end with means for hooking the fastener to the skin, and at its other end with means for securing said fastener in a tensioned condition to said scrape-stock, the latter being provided with projections for this purpose.

9. A skin fastener according to claim 8 in which said resilient member is provided at one end with a generally U-shaped bracket formed with a pair of legs adapted to be clamped about said scrape-stock, as well as being formed with a pair of hooks for receiving and clamping one pair of paws of a skin to be scraped on said scrape-stock.

10. A skin fastener according to claim 9 in which said resilient member is provided at one end with a hook bent over through 180° and adapted to be inserted into the tubular tail portion of a skin to be scraped on said scrape-stock.

11. A scraping appliance for skins of furred animals, particularly mink-skins, and comprising in combination: a stationary frame, a scrape-stock journalled in said frame, said scrape-stock being of circular cross-section uniformly tapering towards one end of the stock, means on said scrape-stock for stretching and fastening a skin spread-out in close engagement with the peripheral surface of said stock, said stock being rounded at its small end and being releasable from said frame at one end, at least, of the stock; and a scraping tool mounted on said frame so as to be displaceable along said scrape-stock as well as being swingable towards the stock in order to cause said scraping tool during the rotation of said stock to scrape said skin when fastened to the stock.

12. In pelt fleshing apparatus, a pelt pole mounted for rotation about its longitudinal axis, a carriage movable longitudinally of the pole substantially parallel therewith, a fleshing blade mounted on and projecting outwardly from the carriage, and manually-operable means on the carriage and connected to the blade for moving the latter towards and away from the pole during movement of the carriage.

No references cited.